(12) United States Patent
Matsushita et al.

(10) Patent No.: US 9,980,081 B2
(45) Date of Patent: May 22, 2018

(54) COMMUNICATION DEVICE

(71) Applicant: DENSO CORPORATION, Kariya, Aichi-pref. (JP)

(72) Inventors: Suguru Matsushita, Kariya (JP); Tatuya Katoh, Kariya (JP); Kenichiro Sanji, Kariya (JP); Noritaka Hirao, Kariya (JP); Koji Nakao, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 39 days.

(21) Appl. No.: 14/904,919

(22) PCT Filed: Jul. 10, 2014

(86) PCT No.: PCT/JP2014/003659
§ 371 (c)(1),
(2) Date: Jan. 13, 2016

(87) PCT Pub. No.: WO2015/008460
PCT Pub. Date: Jan. 22, 2015

(65) Prior Publication Data
US 2016/0150356 A1 May 26, 2016

(30) Foreign Application Priority Data
Jul. 17, 2013 (JP) .................................. 2013-148536

(51) Int. Cl.
*H04W 4/04* (2009.01)
*H04W 4/00* (2018.01)
(Continued)

(52) U.S. Cl.
CPC ........... *H04W 4/008* (2013.01); *H04W 4/046* (2013.01); *H04W 8/005* (2013.01); *H04W 48/16* (2013.01); *H04W 88/06* (2013.01)

(58) Field of Classification Search
CPC ................. H04W 4/008; H04W 8/005; H04W 4/04–4/046; H04W 88/06; H04W 76/02
See application file for complete search history.

(56) References Cited

U.S. PATENT DOCUMENTS

2002/0177472 A1 11/2002 Tomoda et al.
2007/0281735 A1* 12/2007 Suzuki ................ H04M 1/6091
455/551
(Continued)

FOREIGN PATENT DOCUMENTS

DE 60210370 T2 1/2007
EP 1414225 A1 4/2004
(Continued)

OTHER PUBLICATIONS

International Search Report and Written Opinion (in Japanese with English Translation) for PCT/JP2014/003659, dated Sep. 2, 2014; ISA/JP.

*Primary Examiner* — Gennadiy Tsvey
(74) *Attorney, Agent, or Firm* — Harness, Dickey & Pierce, P.L.C.

(57) ABSTRACT

A communication device including a communicator and a communication controller is provided. The communicator has at least two communication ranges including a short communication range and a long communication range longer than the short communication range. The communication controller permits the communicator to perform communication with a terminal present in the short communication range regardless of a priority level of the terminal. The communication controller permits the communicator to perform communication with a terminal present in the long communication range and out of the short communication range when a priority level of the terminal is higher than a predetermined priority level.

18 Claims, 5 Drawing Sheets

(51) Int. Cl.
    *H04W 48/16*     (2009.01)
    *H04W 8/00*     (2009.01)
    *H04W 88/06*     (2009.01)

(56) References Cited

U.S. PATENT DOCUMENTS

| | | | |
|---|---|---|---|
| 2010/0070637 A1* | 3/2010 | Saito | H04M 1/6066 |
| | | | 709/228 |
| 2010/0087146 A1* | 4/2010 | Han | H04B 5/02 |
| | | | 455/41.2 |
| 2011/0028091 A1* | 2/2011 | Higgins | H04L 63/0492 |
| | | | 455/41.2 |
| 2011/0137520 A1* | 6/2011 | Rector | H04M 1/72577 |
| | | | 701/36 |
| 2012/0071097 A1 | 3/2012 | Matsushita et al. | |
| 2012/0076022 A1* | 3/2012 | Shibata | H04L 43/0817 |
| | | | 370/252 |
| 2012/0161927 A1* | 6/2012 | Pierfelice | H04L 63/10 |
| | | | 340/5.83 |
| 2013/0023258 A1 | 1/2013 | Choi et al. | |
| 2013/0217331 A1* | 8/2013 | Manente | H04W 4/008 |
| | | | 455/41.2 |
| 2014/0256257 A1* | 9/2014 | Thangella | H04W 76/046 |
| | | | 455/41.2 |

FOREIGN PATENT DOCUMENTS

| | | |
|---|---|---|
| EP | 2549723 A1 | 1/2013 |
| JP | 2006352799 A | 12/2006 |
| JP | 2009177588 A | 8/2009 |
| JP | 2010130531 A | 6/2010 |
| JP | 2011114741 A | 6/2011 |
| JP | 2012070050 A | 4/2012 |

* cited by examiner

COMMUNICATION DEVICE

CROSS REFERENCE TO RELATED APPLICATIONS

This application is a U.S. National Phase Application under 35 U.S.C. 371 of International Application No. PCT/JP2014/003659 filed on Jul. 10, 2014 and published in Japanese as WO 2015/008460 A1 on Jan. 22, 2015. This application is based on and claims the benefit of priority from Japanese Patent Application No. 2013-148536 filed on Jul. 17, 2013. The entire disclosures of all of the above applications are incorporated herein by reference.

TECHNICAL FIELD

The present disclosure relates to a communication device that performs communication with a terminal.

BACKGROUND ART

Some conventional communication devices for performing communication with a terminal such as a portable terminal and the like are configured to communicate with multiple terminals. Considering that multiple terminals are in a communication range of the communication device, it is proposed to permit the communication with the communication device in a descending order of priority levels pre-set to the terminals (see Patent Literature 1 for example).

PRIOR ART LITERATURES

Patent Literature

Patent Literature 1: JP2010-130531A

SUMMARY OF INVENTION

The inventors of the present application have found out the following with regard to the communication device. In some cases, the communication device described in Patent Literature 1 performs the communication with a low priority level terminal when the terminal is in the communication range of the communication device. As a result, the communication between an intended communication device and an intended terminal cannot be performed.

For example, suppose that there are two communication devices A and B, the terminal A is given high priority for the communication device A, and the terminal B is given high priority for the communication device B. In this situation, the terminal A may perform communication with the communication device B when (a) the terminal A is in an overlap portion between the communication range of the communication device A and the communication range of the communication device B and the terminal B is not in the communication range of the communication device B or (b) the communication device B are communicable with two or more terminals. When the communication between the terminal A and the communication device B starts prior to start of the communication between the terminal A and the communication device A, as long as this communication is disconnected, the terminal A cannot perform the communication with the intended communication device A. Therefore, although the terminal A and the communication device A may become communicable finally, it may take a time to establish the communication.

In view of the foregoing, it is an object of the present disclosure to provide a communication device that satisfactorily enables communication between an intended communication device and an intended terminal.

In order to achieve the above object, a communicator of a communication device has at least two communication ranges including a short communication range and a long communication range longer than the short communication range. A communication controller permits the communicator to perform communication with a terminal that is in the short communication range regardless of a priority level of the terminal in the short communication range, and permits the communicator to perform communication with a terminal that is in the long communication range and out of the short communication range when a priority level of the terminal in the long communication range and out of the short communication range is higher than a predetermined priority level.

Therefore, a terminal that is given a lower priority level than the predetermined priority level may not be able to perform the communication unless it is placed close to the communication device and in the short communication range in the present disclosure. It becomes possible for an intended communication device and an intended terminal to perform communication therebetween.

More specifically, for example, when communication between a low priority level terminal and the communication device is intended, one may take the terminal into the short communication range to enable the communication between the terminal and the communication device. Under another situation where there are two communication devices, when the communication between a first communication device and a terminal that is given high priority for the first communication device is intended for example, the terminal may be placed out of the short communication range of a second communication device to enable the communication between the first communication device and the terminal. In these ways, by referencing the position of the terminal using the respective communication ranges of the communication device, it becomes possible to satisfactorily perform communication between an intended communication device and an intended terminal.

In preference to the communication with a terminal that is in the long communication range and out of the short communication range, the communication controller may permit the communication with a terminal that is in the short communication range regardless of the priority level of this terminal. In this case, when a terminal with a lower priority level than the predetermined priority level is placed close to the communication device and placed in the short communication range, it becomes possible to satisfactorily perform the communication between the terminal and the communication device.

EMBODIMENTS FOR CARRYING OUT INVENTION

Outline Configuration in Embodiment

Figure 1:
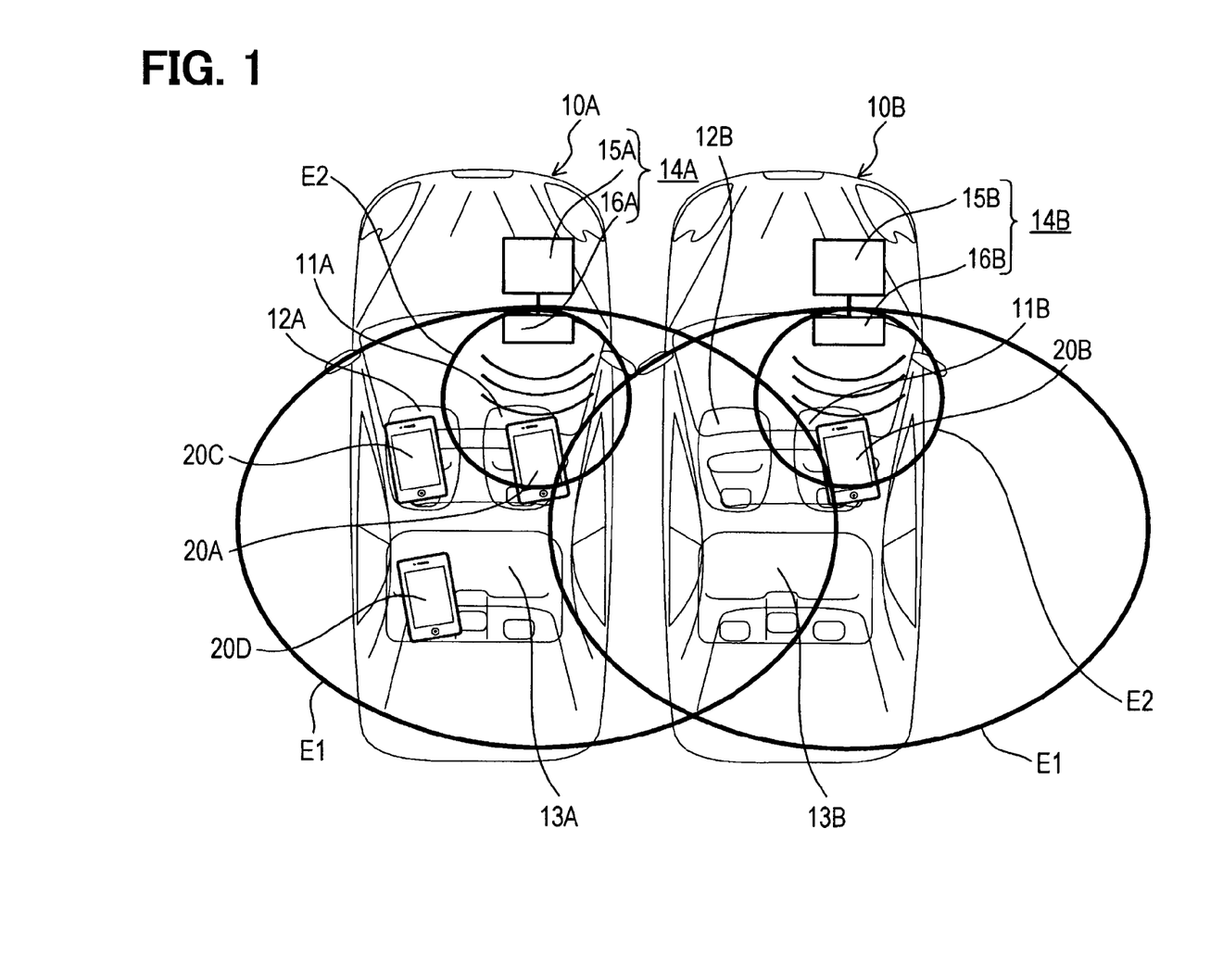
FIG. 1 is a plan view illustrating a configuration of a vehicle equipped with a communication device of an embodiment.

An embodiment will be described with the drawings. FIG. 1 illustrates two vehicles 10A and 10B equipped with communication devices 14A and 14B. In the below description, when distinction between the vehicle 10A and the vehicle 10B is necessary, references of parts may be added with indexes A, B. When the distinction is not necessary, the indexes may not be given.

As shown in FIG. 1, each vehicle 10 is an automobile equipped with a driver seat 11, a front passenger seat 12 and a rear seat 13. A communication device 14 is provided In front of the driver seat 11 of the vehicle 10 and includes an ECU 15 holed inside a dashboard (not shown) or the like and an antenna 16 exposed to a driver (not shown).

Occupants (not shown) of each vehicle 10 can get into the vehicle 10 with their terminals 20A, 20B, 20C, 20D which may include a multifunction portable phone (what is called a smartphone). In this case, the portable terminal 20 can perform communication with the communication device 14. This communication may be performed using a short range wireless communication such as Bluetooth, Wi-Fi (each registered trademark) or the like in order to implement a function cooperating with the vehicle 10 such as audio streaming, handsfree call, data communication or the like. This communication may be used to implement a door lock/unlock function or the like.

The portable terminal 20A carried by an owner of the vehicle 10A is registered as a high priority level portable terminal in the communication device 14A of the vehicle 10A. The portable terminal 20B carried by an owner of the vehicle 10B is registered as a high priority level portable terminal in the communication device 14B of the vehicle 10B. The priorities (which is assumed as high or low for description but may be middle) of respective portable terminals 20 are stored as a table in a memory (not shown) of the ECU 15. Registration of the portable terminal 20 may be made with a unique ID used in Bluetooth.

Figure 2:
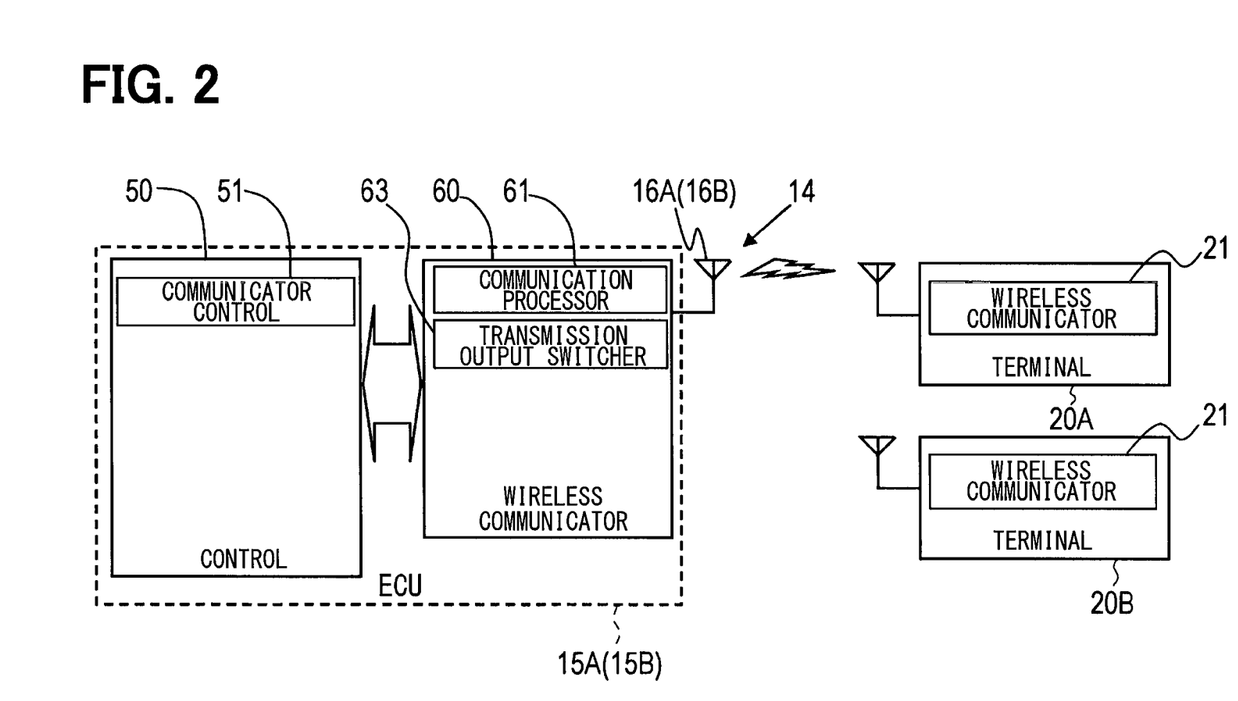
FIG. 2 is a block diagram illustrating a configuration of the communication device.

As shown in FIG. 2, each ECU 15A, 15B includes a controller 50 for executing various processes and a wireless communicator 60 for performing wireless communication with the portable terminal 20. The controller 50 includes a wireless communicator controller 51 for controlling the wireless communicator 60. The wireless communicator 60 includes a communication processor 61 for performing various communication processes such as authenticating the portable terminal 20, establishing the communication and the like, and a transmission output switcher 63 for switching over a radio wave output transmitted from the antenna 16. These controller 50 and wireless communicator 60, or, the wireless communicator controller 51, communication processor 61, transmission output switcher 63 and the like built-in these components may be separated and configured as independent elements or separated in software of the ECU 15. The portable terminal 20 includes a wireless communicator 21 for performing communication with the communication device 14.

The transmission output switcher 63 switches over the output of the radio wave. Thereby, a communication range, which is a range where the antenna 16 and the portable terminal 20 is communicable, is switched over between two communication ranges which are a long communication range E1 and a short communication range E2 as schematically shown in FIG. 1. As shown in FIG. 1, the communication range E2 covers a driver seat 11 (including not only the driver seat 11 but also a cabin space above it). The communication range E1 contains the communication range E2 and covers the entire of the vehicle cabin including the driver seat 11, the front passenger seat 12, and the rear seat 13.

Processes in Embodiment

Figure 3:
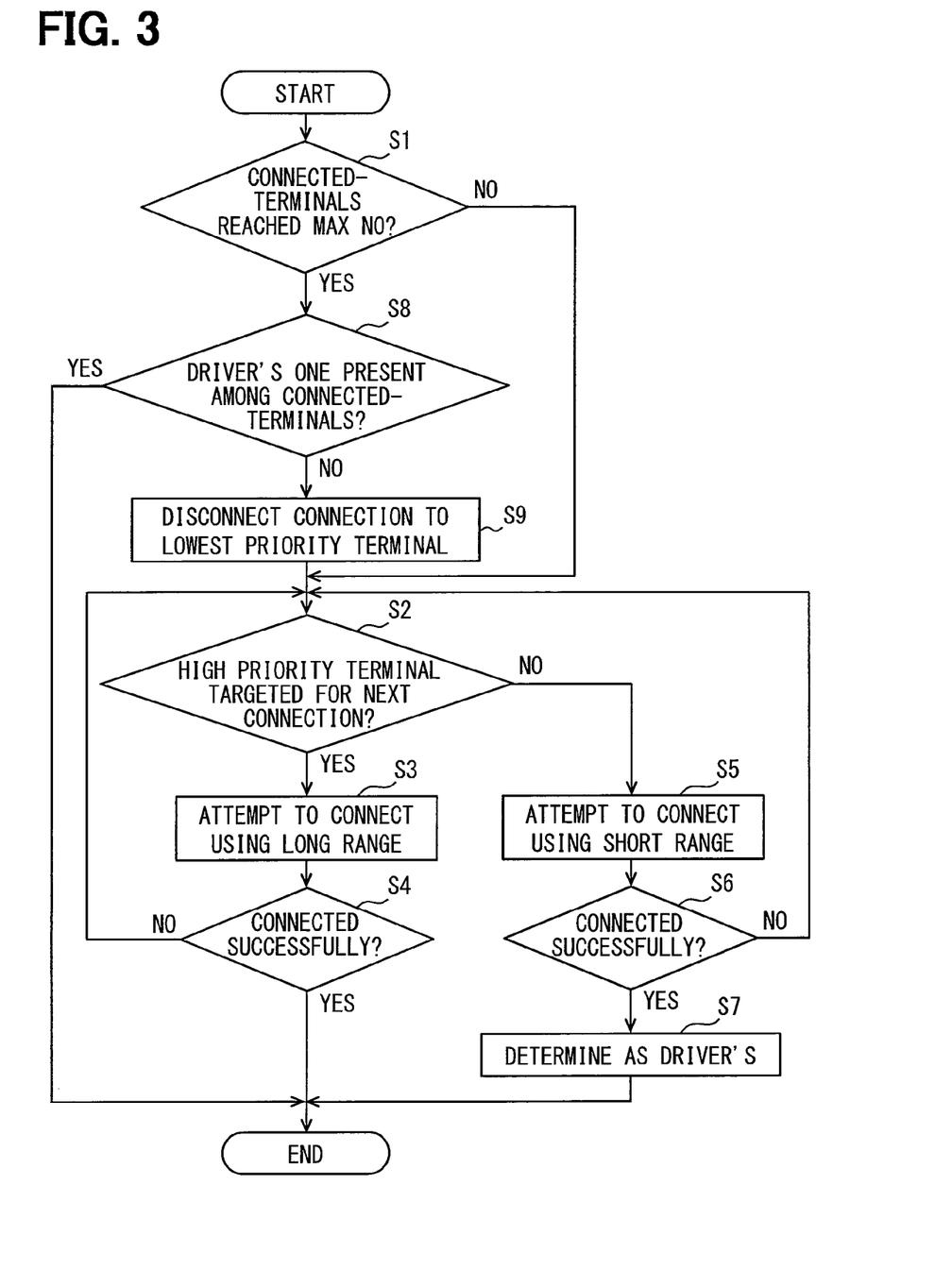
FIG. 3 is a flow chart illustrating processes of the communication device.

The wireless communicator controller 51 repeatedly performs the process illustrated in FIG. 3 at fixed time intervals while the ECU 15 is connected to the battery. As shown in FIG. 3, in this process, it is determined first at S1 whether or not the total number of portable terminals 20 already connected reaches a maximum number (MAX. NO). When the total number does not reach the maximum number (S1: N), the process proceeds to S2 and it is determined whether or not a priority level of a portable terminal 20 targeted for a next connection attempt is a high level. Specifically, in S2 to S7, attempts to connect to respective portable terminals 20 registered in the table are sequentially made in the below way. When the process proceeds to S2 for the first time, it is determined whether or not the priority level of the portable terminal 20 registered in the first on the table is a high level.

When the priority level is high (S2: Y), the attempt to connect is made with the long communication range E1 at S3. At S4, it is determined whether or not the communication has succeeded. When the communication has succeeded (S4: Y), the process is ended. When the communication has failed (S4: N), the process proceeds to S2 again. At S2, it is determined whether or not a priority level of a portable terminal 20 targeted for a next connection attempt is a high level. After the attempt to connect the portable terminal 20 registered at the end on the table is made, the selection of the portable terminal 20 at S2 is made in a loop manner so that the portable terminal 20 registered in the first on the table is selected.

When it is determined at S2 that the priority level of the portable terminal 20 is not a high level (S2: N), the attempt to connect is made at S5 with the short communication range E2. At S6, it is determined whether or not the connection has succeeded. When the connection has succeeded (S6: Y), it is determined at S7 that this portable terminal 20 is a driver's portable terminal 20, and the process is ended. When the connection has not succeeded (S6: N), the process proceeds to S2 again.

When it is determined at S1 that the total number of portable terminals 20 already connected reaches the maximum number (S1: Y), the process proceeds to S8. At S8, it is determined whether or not among the already-connected portable terminals 20, there is the portable terminal 20 determines as the driver's one at S7. When there is the portable terminal 20 determines as the driver's one (S8: Y), the process is ended. When there is no portable terminal 20 determines as the driver's one (S8: N), the process proceeds to S9. At S9, the connection to the lowest priority level portable terminal 20 is disconnected, and then the process proceeds to S2. At S9, when multiple portable terminals 20 are equally the low priority level, arbitrarily-selected one of the multiple portable terminals 20 may be disconnected, or the last-connected one or oldest-connected one of the multiple portable terminals 20 may be disconnected.

Technical Effect in Embodiment

In the present embodiment, the attempt to connect a high priority level portable terminal 20 is made using the long communication range E1 (S3), while the attempt to connect a low priority level portable terminal 20 is made using the short communication range E2 (S5). Therefore, the low priority level portable terminal 20 cannot perform the communication unless it is carried into the driver seat 11, and it becomes possible for an intended communication device 14 and a portable terminal 20 to satisfactorily perform communication therebetween.

Figure 4:
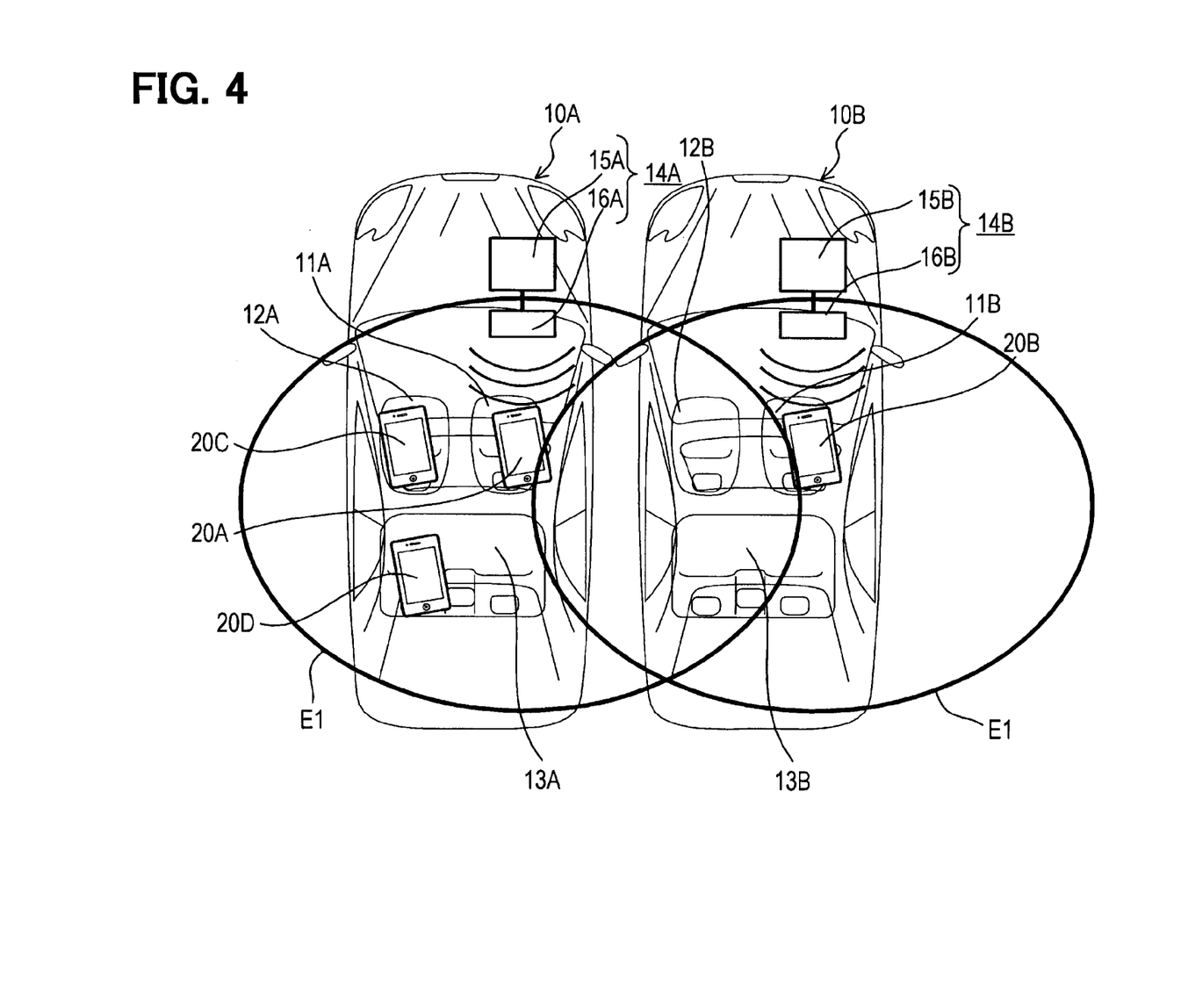
FIG. 4 is a plan view illustrating a configuration of a vehicle equipped with a communication device of a comparative example.

For example, as shown in FIG. 4, suppose that the two vehicles 10A and 10 B are parked or traveling side by side, and that the long communication range E1 of the communication device 14B partially covers the driver seat 11A of the vehicle 10A. Now, for sake of comparison, it is assumed that each communication device 14A, 14B attempts to connect to all the portable terminals 20 using the long communication range E1. In this case, if the communication device 14B has the above-described maximum number of 2 and the communication device 14B is connected to only the portable terminal 20B, the portable terminal 20A may perform the communication with the communication device 14B. Then, if the communication between the portable terminal 20A and the communication device 14B starts before the portable terminal 20A starts communication with the communication device 14A, as long as this communication is disconnected, the portable terminal 20A cannot perform the communication with the intended communication device 14A.

In other words, although the portable terminal 20A and the communication device 14A may become communicable finally, it may take a time to establish the communication. Furthermore, if the portable terminals 20C and 20D each given a low priority level for the communication device 14A are connected to the communication device 14A prior to disconnecting the communication between the portable terminal 20A and the communication device 14B, the communication between the portable terminal 20A and the communication device 14A becomes more difficult provided that the above-described maximum total number is 2.

By contrast, in the present embodiment, because the attempt to connect the low priority level portable terminal 20 is made using the short communication range E2 (S5), the portable terminal 20A is not connected to the communication device 14B as long as the portable terminal 20 is out of the communication range E2 of the communication device 14B as shown in FIG. 1. Therefore, the portable terminal 20A which is given the high priority level for the communication device 14A can be satisfactorily connected to the communication device 14A (S3).

Moreover, when a person carrying the portable terminal 20A which is given the low priority level for the communication device 14B gets into the driver seat 11B of the vehicle 10B as a driver, this portable terminal 20A is inside the communication range E2 of the communication device 14B (S6: Y). Therefore, the low priority level portable terminal 20A carried by the driver is satisfactorily connected to the communication device 14B.

Additionally, in the above case, because it is determined that the portable terminal 20A is the driver's one (S7), this connection is maintained even if multiple portable terminals 20 given higher priority level for the communication device 14B than the portable terminal 20A are carried into the cabin of the vehicle 10B (S8: Y). Additionally, even if the total number of already-connected portable terminals 20 is the maximum number at a time when the driver gets into the vehicle (S1; Y), there is no driver's one among the already-connected ones (S8: N), and thus, the attempt to connect the driver's portable terminal 20 is made. Therefore, the present embodiment can satisfactorily connect the portable terminal 20 carried by the driver to the communication device 14 of the vehicle 10 which he or she intends to drive.

In the above way, the present embodiment satisfactorily enables communication between an intended communication device 14 and portable terminal 20 by referencing the position of the portable terminal 20 using the long communication range E1 and short communication range E2 of the communication device 14. Additionally, in the present embodiment, as shown in FIG. 1, both the communication ranges E1 and E2 partially protrude outside the vehicle. Therefore, the present embodiment is applicable to processes that instruct the lock and unlock of the door of the vehicle 10 with the portable terminal 20. Examples of this application include the followings. When unlocking his or her own vehicle 10A, an owner of the portable terminal 20A can operate at a position distant from the vehicle 10A. When unlocking his or her family member's vehicle 10B with this portable terminal 20A, he or she needs to operate at a position close to the driver seat 11.

Other Embodiments

Embodiments in the present disclosure are not limited to the above-illustrated embodiments and can have various forms. For example, while two communication ranges of the small communication range E2 and the large communication range E1 larger than the small communication range E2 are being employed, the portable terminals 20 may be connected according to priority level regardless of whether or not it is carried by the driver. This processing can be implemented by, for example, omitting S7 and S8 in FIG. 3 In this case, although the low priority level portable terminal 20 may be disconnected from the communication device 14 if it is carried by the driver, the high priority level portable terminal 20 can be surely connected to the communication device 14.

There are various ways of ranking the priority level, including ranking according to an order of past-connections from newest, according to a descending order of the total number of connections, according to user's setting, and the like. In these cases, the high priority level may read the priory level that is higher than or equal to a predetermined ranking. This predetermined ranking may be pre-designated or may be settable arbitrarily.

Furthermore, there are various modifications in the communication ranges E1, E2 of the embodiment. For example, the short communication range E2 may cover the driver seat 11 and the front passenger seat 12. Additionally, when the communication is used for the processes that instruct the lock and unlock of the door of the vehicle 10, the short communication range E2 may cover the surrounding of the vehicle 10 (e.g., an area within 1 meter from the periphery) and the long communication range E1 may cover an area within about 5 meters from the vehicle 10. In contrast, when the communication may be used for processes that used only inside the cabin of the vehicle 10, the communication ranges E1, E2 may be restricted to the vehicle cabin. Furthermore, three or more communication ranges may be prepared.

The process of FIG. 3 or the modification of the process may be started upon a communication request from the portable terminal 20. In this case, it may be determined whether or not the priority level of the portable terminal 20 is high (S2), and a response to the connection request may be made using the communication range E1 or E2 (S3, S5) that matches the priority level. Only the high priority level portable terminal 20 may be registered in the ECU 15, and a non-registered portable terminal 20 may be deemed low priority. Moreover, in the process of FIG. 3, when the total number of already-connected portable terminals 20 reaches the maximum number (S1: Y) and there is the driver's one among these (S8: Y), only S1 and S8 are repeated. In this state, only after a new connection request is made, the process of FIG. 3 may be performed.

In the above embodiment, the output of the radio wave transmitted from the antenna 16 is switched over and thereby the communication range E1 and E2 is switched over. Alternatively, multiple antennas 16 having different communication ranges may be provided and an antenna 16 to be used may be switched over. For example, as shown in the block diagram of FIG. 5, an antenna 16 corresponding to the communication range E1 and an antenna 16 corresponding to the communication range E2 may be provided, and an antenna switch switcher 65 (antenna SW switcher) of the wireless communicator 60 may switch over the antenna 16 to be used.

Figure 5:
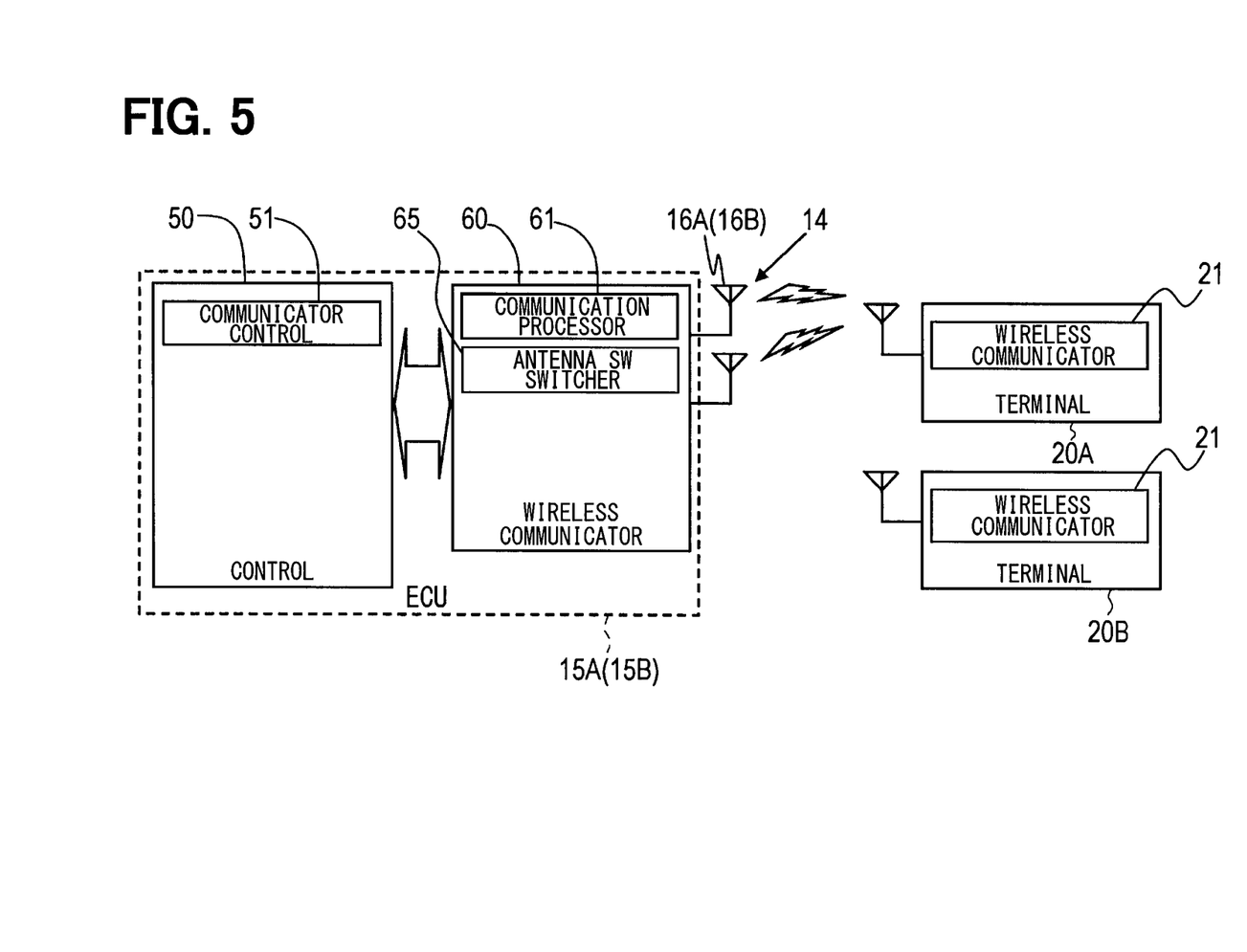
FIG. 5 is a block diagram illustrating a configuration of a communication device of a modification.

In this case, the antenna 16 to be used is switched over by a switching operation of the antenna switch switcher 65 and the communication range E1 and E2 is switched over as is the case in the above embodiment. This provides the same operations and effects as the above embodiment. Additionally, because the switching over of the antenna 16 to be used enables the use of many antennas 16 in arbitrary combinations, the communication range can be switched over in more detailed manners.

In the above embodiments, the antenna 16 and the wireless communicator 60 correspond to a communicator (communication means), the portable terminal 20 corresponds to a terminal, and the controller 50 corresponds to a communication controller (communication control means). Additionally, technical ideas embodied in the above embodiments are applicable to communication devices in various fields other than the vehicle. For example, the same control is applicable to communications between a personal computer and a terminal such as a cellular phone, a mouse and the like.

Although embodiments and configurations in the present disclosure are illustrated above, embodiments and configurations in the present disclosure are limited to those illustrated above. For example, embodiments and configurations in the present disclosure cover those obtained by appropriately combining technical elements disclosed in different embodiments and configurations.

What is claimed is:

1. A communication device comprising:
a communicator having a short communication range and a long communication range, the long communication range being greater than the short communication range; and
a communication controller that controls
the communicator to communicate with a first portable terminal having a first priority level that is located in the short communication range regardless of whether the first priority level is greater than or less than a predetermined priority level, and that controls
the communicator to communicate with a second portable terminal having a second priority level that is located in the long communication range and outside of the short communication range only when the communication controller determines that the second priority level is greater than the predetermined priority level.

2. The communication device according to claim 1, wherein
regardless of first priority level of the first portable terminal, the communication controller controls the communicator to communicate with the first portable terminal in preference to communication with the second portable terminal.

3. The communication device according to claim 1, wherein
the communicator is provided to a vehicle and each of the first and second portable terminals is portable by an occupant of the vehicle.

4. The communication device according to claim 3, wherein
the short communication range corresponds to a driver seat of the vehicle.

5. The communication device according to claim 1, wherein
the communicator comprises a transmission output switcher that switches over an output of a radio wave such that the communication range of the communicator is switched over between the long communication range and the short communication range.

6. The communication device according to claim 1, wherein
the communicator comprises multiple antennas having different communication ranges and an antenna to be used for communication is switched over.

7. The communication device according to claim 1, wherein
the communicator controller repeatedly performs a process at fixed time intervals.

8. The communication device according to claim 1, wherein
the communicator controller repeatedly performs a process upon a communication request from at least one of the first and second portable terminals.

9. The communication device according to claim 1, wherein
when a total number of terminals connected reaches a maximum number, a lowest priority level terminal is disconnected.

10. The communication device according to claim 1, wherein
when a total number of terminals connected reaches a maximum number, and when multiple terminals are at a low priority level, an arbitrarily-selected one of the multiple terminals is disconnected or a last-connected one or an oldest-connected one of the multiple terminals is disconnected.

11. A communication device comprising:
a communicator having a short communication range that covers a driver seat of a vehicle and a long communication range that covers an entire vehicle cabin of the vehicle including the driver seat, a front passenger seat of the vehicle, and a rear seat of the vehicle, the long communication range being greater than the short communication range; and
a communication controller that controls the communicator to communicate with a first portable terminal having a first priority level that is located in the short communication range regardless of whether the first priority level is greater than or less than a predetermined priority level and that controls the communicator to communicate with a second portable terminal having a second priority level that is located in the long communication range and outside of the short communication range only when the communication controller determines that the second priority level is greater than the predetermined priority level.

12. The communication device according to claim 11 wherein the communication device is located in front of the driver seat of the vehicle.

13. The communication device according to claim 11, wherein
the communicator comprises a transmission output switcher that switches over an output of a radio wave such that the communication range of the communicator is switched over between the long communication range and the short communication range.

14. The communication device according to claim 11, wherein
the communicator comprises multiple antennas having different communication ranges and an antenna to be used for communication is switched over.

15. The communication device according to claim 11, wherein
the communicator controller repeatedly performs a process at fixed time intervals.

16. The communication device according to claim 11, wherein
the communicator controller repeatedly performs a process upon a communication request from at least one of the first and second portable terminals.

17. The communication device according to claim 11, wherein
when a total number of terminals connected reaches a maximum number, a lowest priority level terminal is disconnected.

18. The communication device according to claim 11, wherein
when a total number of terminals connected reaches a maximum number, and when multiple terminals are at a low priority level, an arbitrarily-selected one of the multiple terminals is disconnected or a last-connected one or an oldest-connected one of the multiple terminals is disconnected.

* * * * *